United States Patent
Takahashi (10) Patent No.: US 10,513,295 B2
(45) Date of Patent: Dec. 24, 2019

(54) VEHICLE LOWER PORTION STRUCTURE

(71) Applicant: TOYOTA JIDOSHA KABUSHIKI KAISHA, Toyota-Shi, Aichi-Ken (JP)

(72) Inventor: Naoki Takahashi, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 70 days.

(21) Appl. No.: 15/985,974

(22) Filed: May 22, 2018

(65) Prior Publication Data

US 2018/0370577 A1    Dec. 27, 2018

(30) Foreign Application Priority Data

Jun. 21, 2017    (JP) ................. 2017-121627

(51) Int. Cl.
*B62D 25/20* (2006.01)
*B60K 1/04* (2019.01)
*B62D 21/15* (2006.01)

(52) U.S. Cl.
CPC .......... *B62D 25/2018* (2013.01); *B60K 1/04* (2013.01); *B62D 21/157* (2013.01); *B60K 2001/0438* (2013.01); *B60Y 2306/01* (2013.01)

(58) Field of Classification Search
CPC .... B62D 25/2015; B62D 21/157; B60K 1/04; B60K 2001/0438; B60Y 2306/01
See application file for complete search history.

(56) References Cited

U.S. PATENT DOCUMENTS

| | | | | |
|---|---|---|---|---|
| 6,123,378 A | * | 9/2000 | Teply | .......... B62D 23/005 296/29 |
| 6,139,094 A | * | 10/2000 | Teply | .......... B62D 23/005 296/203.03 |
| 2004/0239091 A1 | * | 12/2004 | Horton | .......... B62D 21/02 280/781 |
| 2011/0174556 A1 | * | 7/2011 | Hermann | .......... H01M 2/1077 180/65.1 |
| 2018/0194212 A1 | * | 7/2018 | Hamilton | .......... B60K 1/04 |

FOREIGN PATENT DOCUMENTS

| | | |
|---|---|---|
| JP | 2013-014274 A | 1/2013 |
| JP | 2013-082392 A | 5/2013 |
| JP | 2015-150927 A | 8/2015 |

* cited by examiner

*Primary Examiner* — Lori L Lyjak
(74) *Attorney, Agent, or Firm* — Oliff PLC (57) ABSTRACT

A vehicle lower portion structure includes a pair of rocker panels, the rocker panels being separated from each other in a vehicle width direction and extending in a vehicle front-rear direction, an intermediate cross member disposed between the rocker panels and extending in the vehicle width direction, an intermediate connecting member disposed in an end portion of the intermediate cross member in the vehicle width direction and provided with a first contact portion which is contact with the rocker panel and a second contact portion which is contact with the intermediate cross member, a first bonding portion bonding the first contact portion to the rocker panel, and a second bonding portion bonding the second contact portion to the intermediate cross member.

14 Claims, 4 Drawing Sheets

VEHICLE LOWER PORTION STRUCTURE

INCORPORATION BY REFERENCE

The disclosure of Japanese Patent Application No. 2017-121627 filed on Jun. 21, 2017 including the specification, drawings and abstract is incorporated herein by reference in its entirety.

BACKGROUND

1. Technical Field

The present disclosure relates to a vehicle lower portion structure.

2. Description of Related Art

Japanese Unexamined Patent Application Publication No. 2013-14274 (JP 2013-14274 A) discloses a structure in which a battery accommodation portion accommodating a battery is disposed below a floor panel of a vehicle cabin. In the structure that is disclosed in JP 2013-14274 A, a cross member extending in a vehicle width direction is disposed in the upper surface portion of a floor surface.

SUMMARY

In a structure in which a pair of rocker panels is provided such that the rocker panels are separated from each other in a vehicle width direction, the bond strength of the rocker panel and a cross member may become relatively low when the length of the cross member extending in the vehicle width direction is shorter than the gap between the rocker panels.

The present disclosure provides a vehicle lower portion structure in which an intermediate cross member can be reliably bonded to a rocker panel even in a case where the length of the cross member extending in a vehicle width direction is shorter than the gap between a pair of the rocker panels.

An aspect of the disclosure relates to a vehicle lower portion structure including a pair of rocker panels, an intermediate cross member, an intermediate connecting member, a first bonding portion, and a second bonding portion. The rocker panels are separated from each other in a vehicle width direction and extending in a vehicle front-rear direction. The intermediate cross member is disposed between the rocker panels and extends in the vehicle width direction. The intermediate connecting member is disposed in an end portion of the intermediate cross member in the vehicle width direction and is provided with a first contact portion which is contact with the rocker panel and a second contact portion which is contact with the intermediate cross member. The first bonding portion bonds the first contact portion to the rocker panel. The second bonding portion bonds the second contact portion to the intermediate cross member.

According to the aspect of the disclosure, the intermediate cross member is disposed between the rocker panels and the intermediate connecting member is disposed in the end portion of the intermediate cross member in the vehicle width direction. The intermediate connecting member is contact with the rocker panel in the first contact portion and is contact with the intermediate cross member in the second contact portion. The first contact portion is bonded to the rocker panel by the first bonding portion and the second contact portion is bonded to the intermediate cross member by the second bonding portion.

The intermediate cross member is bonded to the rocker panels via the intermediate connecting member as described above, and thus the intermediate cross member can be reliably bonded to the rocker panel even when the length of the intermediate cross member is shorter than the gap between the rocker panels.

The vehicle lower portion structure according to the aspect of the disclosure may further include a front cross member connecting the rocker panels to each other and disposed on a front side of the vehicle lower portion structure, and a rear cross member connecting the rocker panels to each other and disposed rearward of the front cross member. A frame-shaped frame member may be constituted by the rocker panels, the front cross member, and the rear cross member.

According to the aspect of the disclosure, the frame-shaped frame member is constituted by the rocker panels, the front cross member, and the rear cross member, and thus the shape of the vehicle lower portion structure can be stably maintained. The intermediate cross member is disposed between the rocker panels in the frame member, and thus the shape of the frame member can be further stably maintained.

In the vehicle lower portion structure according to the aspect of the disclosure, the first contact portion may be a first contact surface which is surface contact with the rocker panel and the second contact portion may be a second contact surface which is surface contact with the intermediate cross member.

According to the aspect of the disclosure, the intermediate connecting member is brought into surface contact with the rocker panel by the first contact surface, and thus the intermediate connecting member and the rocker panel can be reliably bonded to each other at a wider contact part than in a structure of line or point contact. Likewise, the intermediate connecting member is brought into surface contact with the intermediate cross member by the second contact surface, and thus the intermediate connecting member and the intermediate cross member can be reliably bonded to each other at a wider contact part.

In the vehicle lower portion structure according to the aspect of the disclosure, the intermediate cross member may be provided with a cross member upper surface positioned on a vehicle upper side, a cross member front surface positioned forward of the cross member upper surface, and a cross member rear surface positioned rearward of the cross member upper surface. The second contact surface may be provided with a second contact upper surface which is contact with the cross member upper surface, a second contact front surface which is contact with the cross member front surface, and a second contact rear surface which is contact with the cross member rear surface.

According to the aspect of the disclosure, the second contact upper surface, the second contact front surface, and the second contact rear surface of the second contact surface are surface contact with the cross member upper surface, the cross member front surface, and the cross member rear surface of the intermediate cross member, respectively. In other words, the intermediate connecting member is surface contact with the intermediate cross member on three surfaces that have different positions, and thus the intermediate connecting member and the intermediate cross member can be bonded more firmly to each other.

In the vehicle lower portion structure according to the aspect of the disclosure, the second contact upper surface, the second contact front surface, and the second contact rear surface may have normal lines in different directions.

According to the aspect of the disclosure, the second contact upper surface, the second contact front surface, and the second contact rear surface have different normal directions, and thus a bonding structure firmer than a structure in which the second contact upper surface, the second contact front surface, and the second contact rear surface have the same normal direction can be adopted.

In the vehicle lower portion structure according to the aspect of the disclosure, the rocker panel may be provided with a rocker panel upper surface positioned on the vehicle upper side of the rocker panel and a rocker panel inner surface positioned below and inward of the rocker panel upper surface in the vehicle width direction. The first contact surface may be provided with a first contact upper surface which is contact with the rocker panel upper surface and a first contact inner surface which is contact with the rocker panel inner surface.

According to the aspect of the disclosure, the first contact upper surface and the first contact inner surface of the first contact surface are surface contact with the rocker panel upper surface and the rocker panel inner surface of the rocker panel, respectively. In other words, the intermediate connecting member is surface contact with the rocker panel on two surfaces that have different positions, and thus the intermediate connecting member and the rocker panel can be bonded more firmly to each other.

In the vehicle lower portion structure according to the aspect of the disclosure, the first contact upper surface and the first contact inner surface may have normal lines in different directions.

According to the aspect of the disclosure, the first contact upper surface and the first contact inner surface have different normal directions, and thus a higher bond strength can be obtained than in a structure in which the first contact upper surface and the first contact inner surface have the same normal direction.

In the vehicle lower portion structure according to the aspect of the disclosure, a normal line of the rocker panel inner surface may be toward a vehicle inside in a vehicle horizontal direction and a normal line of the first contact inner surface may be toward a vehicle outside in the vehicle horizontal direction.

In the vehicle lower portion structure according to the aspect of the disclosure, the rocker panel may have a surface portion disposed below and inward of the rocker panel inner surface in the vehicle width direction to support the end portion of the intermediate cross member in the vehicle width direction.

According to the aspect of the disclosure, the end portion of the intermediate cross member in the vehicle width direction is supported by the surface portion, and thus the intermediate cross member can be bonded more firmly to the rocker panel at a stable position. Some of the load of the intermediate cross member acts on the surface portion and does not act on the intermediate connecting member, and thus the state of bonding between the intermediate connecting member and the intermediate cross member becomes more stable.

In the vehicle lower portion structure according to the aspect of the disclosure, the rocker panel may include the surface portion, a rocker panel lower portion disposed below the surface portion, and a rocker panel upper portion disposed above the surface portion and the rocker panel lower portion may protrude inward in the vehicle width direction more than the rocker panel upper portion.

The vehicle lower portion structure according to the aspect of the disclosure may further include an energy absorbing member disposed to overlap the intermediate connecting member in part or in whole in the vehicle width direction to absorb energy by being deformed by a load that is applied inward in the vehicle width direction. A yield strength of compression of the intermediate connecting member may be lower than a yield strength of compression of the energy absorbing member in the vehicle width direction.

According to the aspect of the disclosure, the load to the vehicle width direction inside can be absorbed by the energy absorbing member being deformed. Since the yield strength of compression of the intermediate connecting member is lower than the yield strength of compression of the energy absorbing member in the vehicle width direction, the intermediate connecting member does not inhibit deformation of the energy absorbing member.

In the vehicle lower portion structure according to the aspect of the disclosure, the length of the intermediate cross member in the vehicle width direction may be shorter than a gap between the rocker panel inner surfaces of the rocker panels.

In the vehicle lower portion structure according to the aspect of the disclosure, the intermediate cross member may be disposed with a gap formed between the end portion of the intermediate cross member in the vehicle width direction and the rocker panel.

In the vehicle lower portion structure according to the aspect of the disclosure, the first bonding portion may be at least one male screw and the second bonding portion may be at least one male screw.

According to the aspect of the disclosure, the intermediate cross member can be reliably bonded to the rocker panel even when the length of the cross member extending in the vehicle width direction is shorter than the gap between the rocker panels in the vehicle lower portion structure.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a vehicle lower portion structure 102 according to an embodiment will be described with reference to accompanying drawings. The arrows FR, UP, and RH in the drawings represent the front, top, and width direction right side of a vehicle, respectively.

Figure 2:
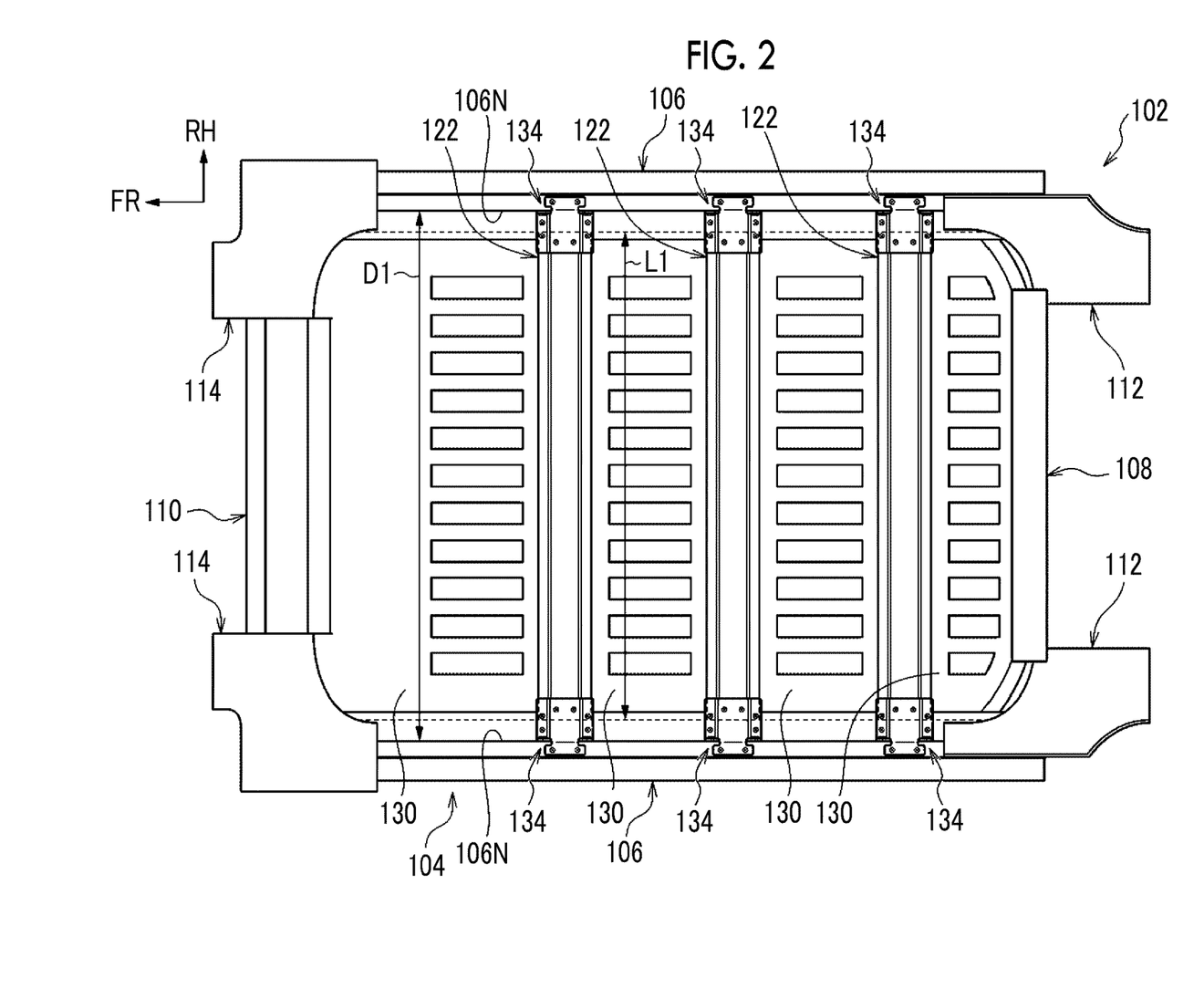
FIG. 2 is a plan view illustrating the vehicle lower portion structure according to the embodiment.

As illustrated in FIG. 2, the vehicle lower portion structure 102 has a frame member 104 that has the shape of a rectangular frame when seen from the top of the vehicle. The frame member 104 is a member disposed between an axle on the front side and an axle on the rear side and constituting the lower portion of the vehicle.

The frame member 104 has a pair of rocker panels 106. The rocker panels 106 are separated from each other in the vehicle width direction and respectively extend in the vehicle front-rear direction. The frame member 104 has a rear cross member 108 and a front cross member 110 extending in the vehicle width direction, and the rear cross member 108 and the front cross member 110 are respectively disposed on the rear side and the front side of the frame member 104. The respective rear ends of the rocker panels 106 and both ends of the rear cross member 108 in the vehicle width direction are connected to each other by rear connecting members 112. The respective front ends of the rocker panels 106 and both ends of the front cross member 110 in the vehicle width direction are connected to each other by front connecting members 114. The frame member 104 as a whole forms the rectangular frame shape by the rocker panels 106 being connected to the rear cross member 108 and the front cross member 110 by the rear connecting members 112 and the front connecting members 114 as described above.

Figure 1:
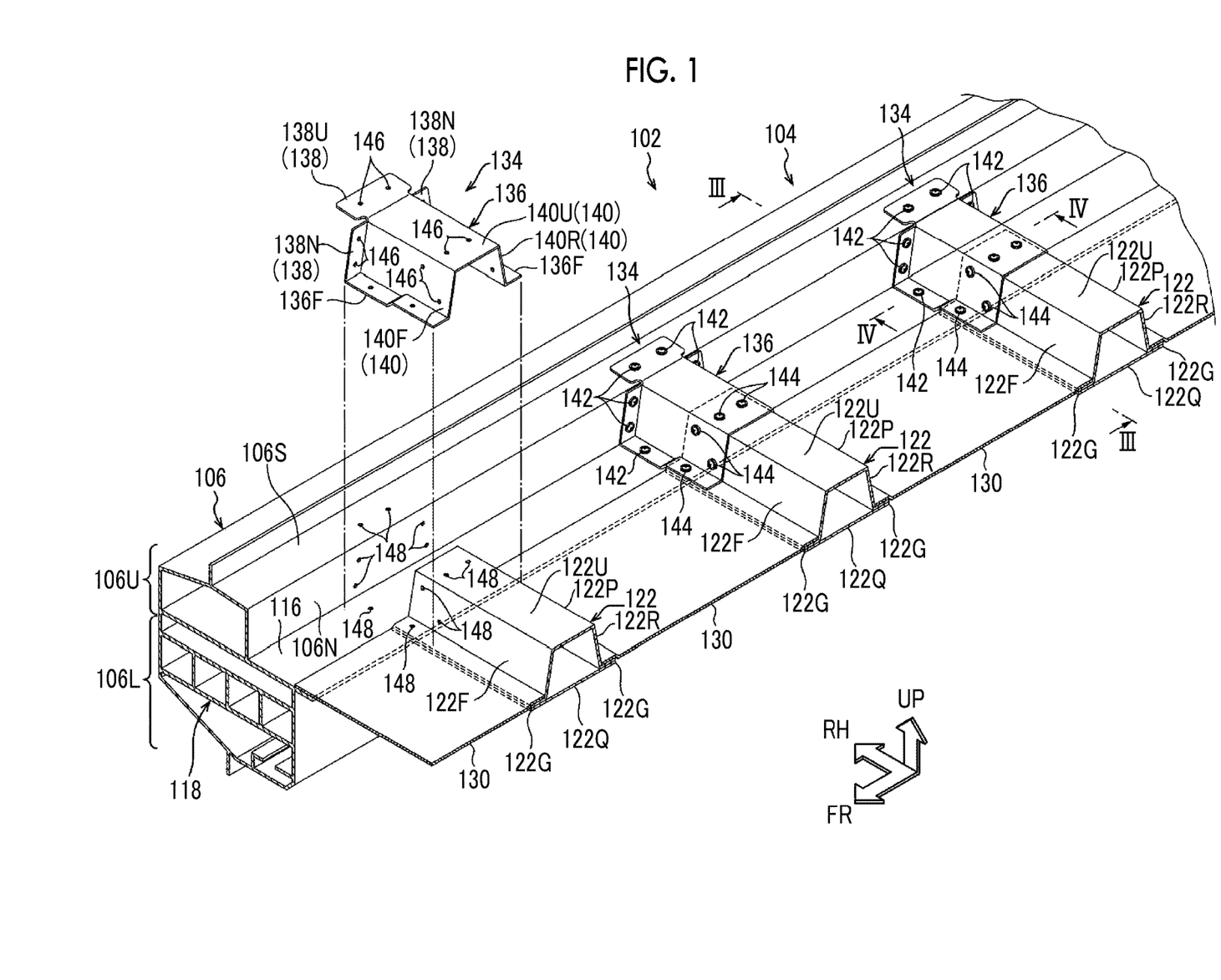
FIG. 1 is a perspective view illustrating a vehicle lower portion structure according to an embodiment.
Figure 3:
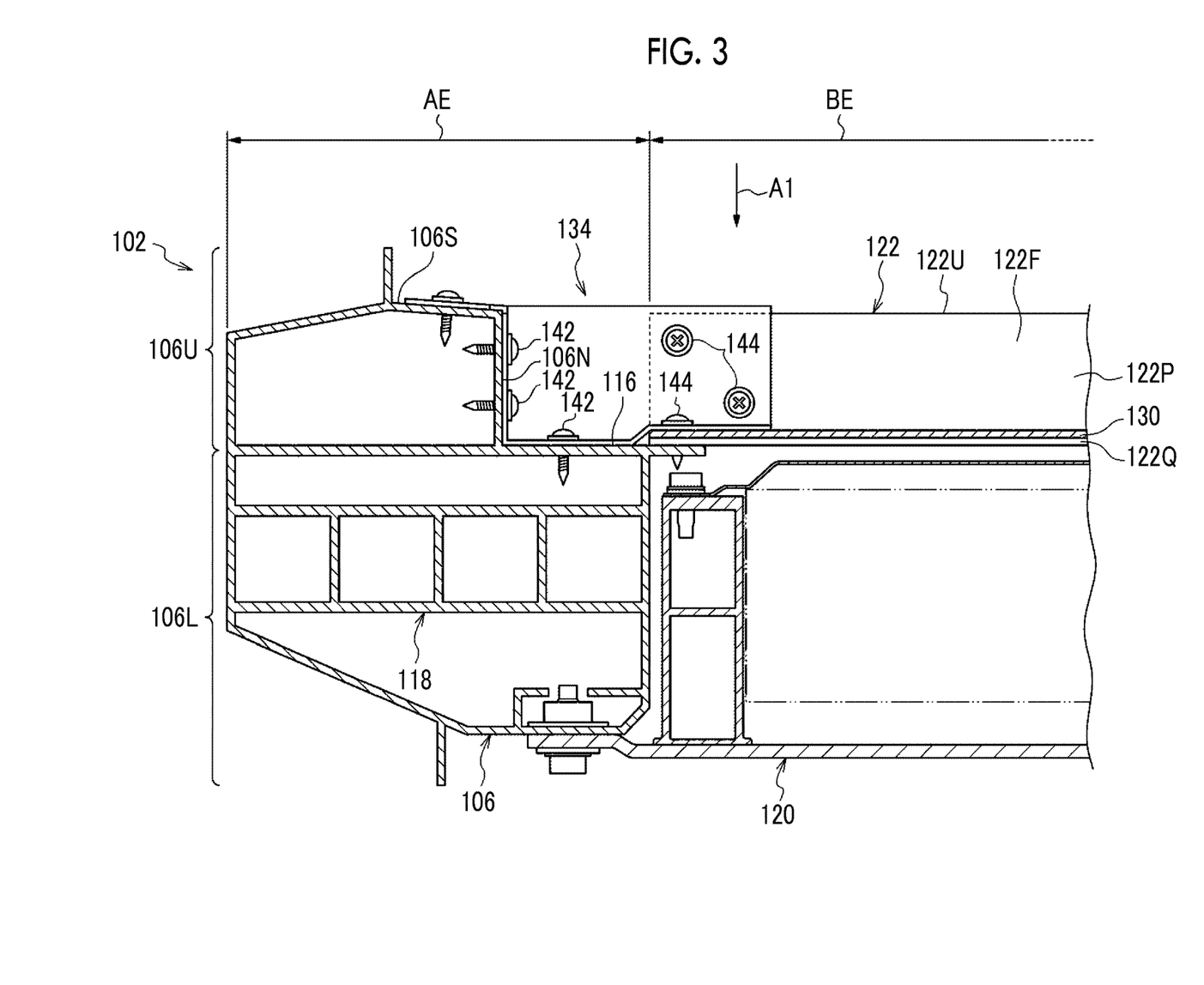
FIG. 3 is a cross-sectional view taken along line III-III of FIG. 1 and illustrating the vehicle lower portion structure according to the embodiment.

As illustrated in FIGS. 1 and 3, each of the rocker panels 106 has a hollow closed cross-sectional shape in the cross section in the vehicle width direction. In the rocker panel 106, a substantially horizontal surface portion 116 is formed at the substantially intermediate position in the up-down direction. A rocker panel lower portion 106L as a part below the surface portion 116 protrudes more to the vehicle width direction inside than a rocker panel upper portion 106U as a part above the surface portion 116. An energy absorbing member 118 is accommodated in the rocker panel lower portion 106L. When a vehicle side collision occurs, for example, some of the energy of the impact can be absorbed by the energy absorbing member 118 being deformed.

In the rocker panel upper portion 106U, the rocker panel 106 has a rocker panel upper surface 106S positioned on the vehicle upper side and a rocker panel inner surface 106N positioned on the vehicle lower side and inside the rocker panel upper surface 106S in the vehicle width direction.

In the cross section in the vehicle width direction, the rocker panel upper surface 106S is a surface inclined slightly downward toward the vehicle width direction inside and the rocker panel inner surface 106N is a surface rising in a substantially vertical direction. The rocker panel upper surface 106S and the rocker panel inner surface 106N are continuous. The surface portion 116 is a surface positioned on the vehicle lower side and inside the rocker panel inner surface 106N in the vehicle width direction.

In plan view (as seen in the arrow A1 direction in FIG. 3), at least one battery pack 120 is mounted inside the frame member 104. In the example that is illustrated in FIG. 3, the battery pack 120 has a rectangular parallelepiped shape and is mounted in the frame member 104 in the direction in which the thickness direction of the battery pack 120 corresponds to the vehicle up-down direction. The vehicle that is provided with the vehicle lower portion structure 102 according to the present embodiment is a vehicle traveling by driving a motor with electric power supplied from the battery pack 120.

The battery pack 120 is an example of a mounting member. The present embodiment is also applicable to a vehicle driven with the energy that is obtained from a chemical reaction of hydrogen accommodated in a hydrogen tank. In this case, the hydrogen tank is an example of the mounting member.

In the present embodiment, the up-down position of the battery pack 120 corresponds to the position where the rocker panel lower portion 106L is formed and the battery pack 120 does not protrude upward beyond the surface portion 116 as illustrated in FIG. 3.

As illustrated in FIG. 2, at least one intermediate cross member 122 is disposed between the rocker panels 106 and at positions on the upper side of the surface portion 116. The intermediate cross member 122 extends in the vehicle width direction. In the illustrated example, three intermediate cross members 122 are disposed apart from each other in the vehicle front-rear direction.

The intermediate cross member 122 is supported by the surface portion 116 in both end portions of the intermediate cross member 122 in the longitudinal direction (vehicle width direction). The intermediate cross member 122 is bonded to the rocker panel 106 by an intermediate connecting member 134 (described later). Although the three intermediate cross members 122 are disposed apart from each other in the vehicle front-rear direction in the present embodiment, the number of the intermediate cross members 122 is not particularly limited.

As illustrated in FIG. 1, in the present embodiment, the intermediate cross member 122 has a substantially hat-shaped cross upper plate 122P open to the vehicle lower side when seen in the cross section in the vehicle front-rear direction and a flat plate-shaped cross lower plate 122Q blocking the open part of the cross upper plate 122P on the vehicle lower side.

Flanges 122G extending forward and rearward in the vehicle front-rear direction are formed at the lower ends of the cross upper plate 122P. The intermediate cross member 122 is formed in a hollow quadrangular tubular shape by the flanges 122G being joined to the front and rear side parts of the cross lower plate 122Q.

Each of the intermediate cross members 122 has a cross member upper surface 122U positioned on the vehicle upper side, a cross member front surface 122F positioned forward of the cross member upper surface 122U, and a cross member rear surface 122R positioned rearward of the cross member upper surface 122U.

The cross member upper surface 122U is a substantially horizontal surface. The cross member front surface 122F is a surface continuous from the cross member upper surface 122U, and is inclined downward to the vehicle lower side as the cross member front surface 122F extends forward in the vehicle front-rear direction. In the present embodiment, the cross member upper surface 122U is on the same plane (has the same up-down position) as the rocker panel upper surface 106S. The cross member rear surface 122R is a surface continuous from the cross member upper surface 122U, and is inclined downward to the vehicle lower side as the cross member rear surface 122R extends rearward in the vehicle front-rear direction.

A lid plate 130 covering the battery pack 120 from above is attached to the intermediate cross member 122.

As illustrated in FIG. 2, in the present embodiment, a length L1 of the intermediate cross member 122 (length in the vehicle width direction) is shorter than a gap D1 between the rocker panel inner surfaces 106N of the rocker panels 106. Especially, the present embodiment has a structure in which the intermediate cross member 122 is short to the extent that the intermediate cross member 122 does not reach an energy absorption range AE as described later.

As illustrated in FIGS. 1 to 3, the intermediate connecting members 134 are disposed in both end portions of the intermediate cross member 122 in the vehicle width direction. In the present embodiment, the intermediate connecting member 134 has an inverted U-shaped body portion 136 open to the vehicle lower side when seen in the cross section (end surface) in the vehicle front-rear direction.

Figure 4:
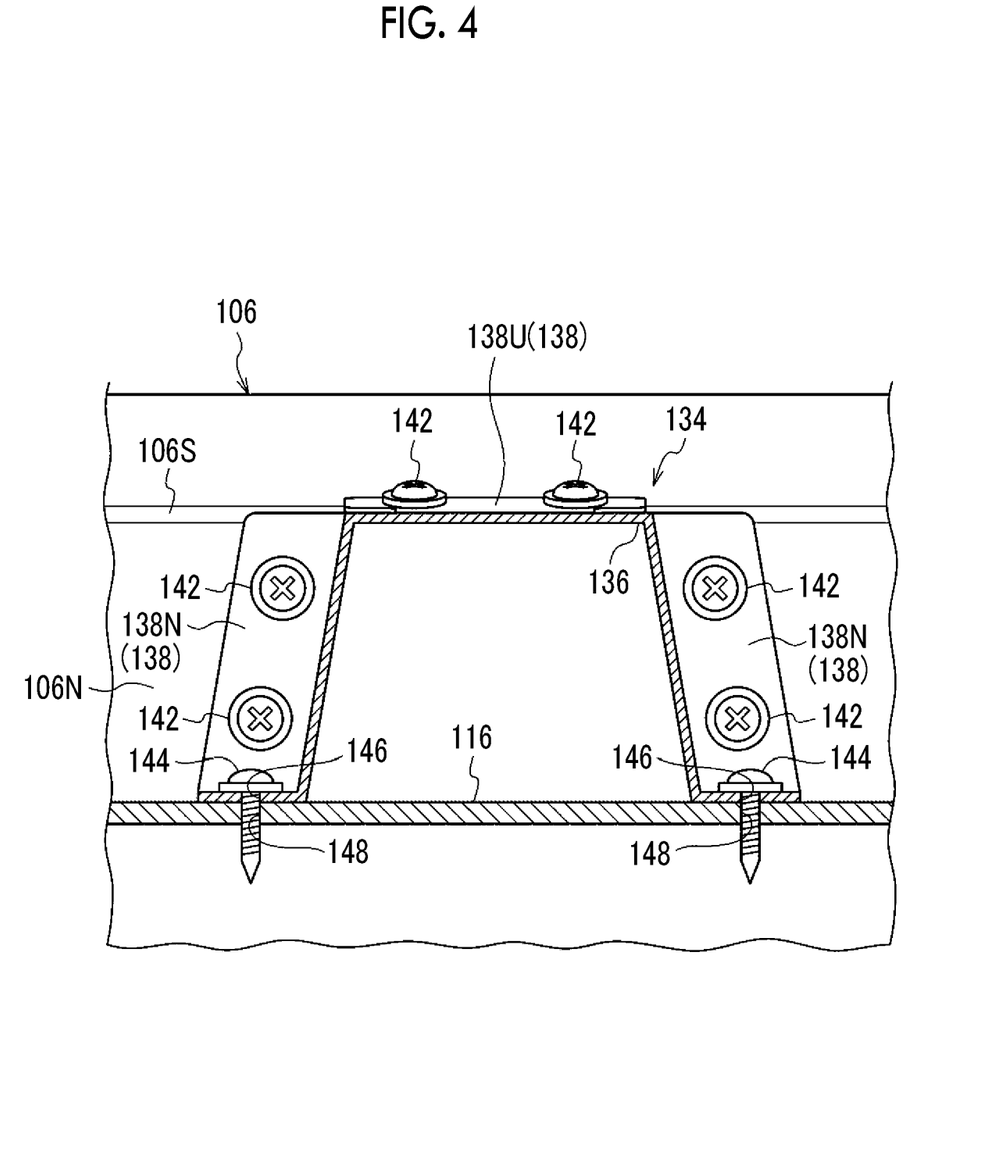
FIG. 4 is a cross-sectional view taken along line IV-IV of FIG. 1 and illustrating the vehicle lower portion structure according to the embodiment.

A first contact surface 138 and a second contact surface 140 extend from the body portion 136. Specifically, the first contact surface 138 has a first contact upper surface 138U and a first contact inner surface 138N. The first contact upper surface 138U is surface contact with the rocker panel upper surface 106S from the vehicle upper side. The first contact inner surface 138N is surface contact with the rocker panel inner surface 106N from the vehicle width direction inside. As illustrated in FIG. 4, the first contact inner surfaces 138N respectively extend forward and rearward in the vehicle front-rear direction. The intermediate connecting member 134 is in surface contact with the rocker panel 106 on three contact surfaces. The first contact upper surface 138U and the first contact inner surface 138N are surfaces that have normal lines in different directions.

The second contact surface 140 has a second contact upper surface 140U, a second contact front surface 140F, and a second contact rear surface 140R. The second contact upper surface 140U is contact with the cross member upper surface 122U from the vehicle upper side. The second contact front surface 140F is contact with the cross member front surface 122F from the front side in the vehicle front-rear direction. The second contact rear surface 140R is contact with the cross member rear surface 122R from the rear side in the vehicle front-rear direction. The intermediate connecting member 134 is in surface contact with the intermediate cross member 122 on three contact surfaces. The second contact upper surface 140U, the second contact front surface 140F, and the second contact rear surface 140R are surfaces that have normal lines in different directions.

In the present embodiment, the second contact surface 140 is configured substantially as a part positioned on the vehicle width direction inside, that is, a part of the body portion 136 in the body portion 136.

Furthermore, the intermediate connecting member 134 has contact flanges 136F extending forward and rearward in the vehicle front-rear direction from the body portion 136. The contact flange 136F is in contact with the surface portion 116 and the lid plate 130 from the vehicle upper side.

The intermediate connecting member 134 is bonded to the rocker panel 106 by a male screw 142. The male screw 142 is an example of a first bonding portion. In addition, the intermediate connecting member 134 is bonded to the intermediate cross member 122 by a male screw 144. The male screw 144 is an example of a second bonding portion. As described above, the intermediate cross member 122 is bonded to each of the rocker panels 106 with the intermediate connecting member 134 interposed.

At the part where the contact flange 136F is in contact with the lid plate 130, the flange 122G is positioned on the vehicle lower side of the lid plate 130. The intermediate connecting member 134 is bonded to the intermediate cross member 122 and the rocker panel 106 by the male screw 144.

In the present embodiment, the male screw 142 is set in a plurality of places on each of three first contact surfaces 138. Accordingly, bonding can be performed more firmly than in a structure in which the male screw 142 is set in one place on each of the first contact surfaces 138. In addition, relative rotation of the rocker panel 106 and the intermediate connecting member 134 about the male screw 142 can be effectively suppressed.

At the same time, in the present embodiment, the male screw 144 is set in a plurality of places on each of three second contact surfaces 140. Accordingly, bonding can be performed more firmly than in a structure in which the male screw 144 is set in one place on each of the second contact surfaces 140. In addition, relative rotation of the intermediate cross member 122 and the intermediate connecting member 134 about the male screw 144 can be effectively suppressed.

In the present embodiment, an insertion hole 146 into which the male screw 142 or the male screw 144 is inserted is formed in the intermediate connecting member 134. A female screw 148 screwed with the male screw 142 or the male screw 144 is formed in each of the rocker panel 106 and the intermediate cross member 122. In other words, the intermediate connecting member 134 is attached to the rocker panel 106 and the intermediate cross member 122 by the male screw 142 or the male screw 144 inserted into the insertion hole 146 being screwed with the female screw 148. Although the female screw 148 may also be formed in advance in the rocker panel 106 and the intermediate cross member 122, the female screw 148 may also be formed while, for example, the rocker panel 106 and the intermediate cross member 122 are perforated by the male screw 142 or the male screw 144 being used or the diameter of a hole is increased.

The male screw 142 is an example of the first bonding portion and the male screw 144 is an example of the second bonding portion. The first bonding portion and the second bonding portion are not limited to the male screws as described above. For example, the first bonding portion and the second bonding portion may also be configured by a bolt and a nut being used. Furthermore, a fastening member such as a rivet and welding may be used as the first bonding portion and the second bonding portion.

As illustrated in FIG. 3, a part of the energy absorbing member 118 is disposed at a position overlapping the intermediate connecting member 134 in the vehicle width direction when seen from the vehicle upper side. The yield strength of compression of the intermediate connecting member 134 in the vehicle width direction is set lower than the yield strength of compression of the energy absorbing member 118. The "yield strength" of compression is the difficulty of deformation with respect to a compressive force. In other words, in a case where a compressive force in the vehicle width direction acts on the energy absorbing member 118 and the intermediate connecting member 134, the intermediate connecting member 134 is easily compressed and the intermediate connecting member 134 does not inhibit compression of the energy absorbing member 118.

As illustrated in FIG. 3, the intermediate cross member 122 is disposed in a battery mounting range BE of the vehicle lower portion structure 102 and does not reach the energy absorption range AE (range in which the energy absorbing member 118 is present) when seen in the cross section in the vehicle width direction. In other words, in this structure, the intermediate cross member 122 is short to the extent that the intermediate cross member 122 does not reach the energy absorption range AE so that deformation-based energy absorption is reliably performed without deformation of the energy absorbing member 118 being inhibited.

The action of the present embodiment will be described below.

As illustrated in FIG. 2, the vehicle lower portion structure 102 according to the present embodiment has a structure in which the intermediate cross member 122 continuously stretches without being divided between the rocker panels 106. In the structure in which the intermediate cross member 122 is continuous without being divided between the rocker panels 106 as described above, the intermediate cross member 122 is longer in the vehicle width direction than in a structure in which the intermediate cross member 122 is divided.

In the present embodiment, the intermediate connecting members 134 are disposed at both ends of the intermediate cross member 122 in the vehicle width direction. The intermediate connecting member 134 is in surface contact with the rocker panel 106 on the first contact surface 138 and is bonded to the rocker panel 106 by the male screw 142 on the first contact surface 138. In addition, the intermediate connecting member 134 is in surface contact with the intermediate cross member 122 on the second contact surface 140 and is bonded to the intermediate cross member 122 by the male screw 144 on the second contact surface 140. As described above, the intermediate connecting member 134 is interposed between the intermediate cross member 122 and the rocker panel 106. Accordingly, the intermediate cross member 122 can be reliably bonded to the rocker panel 106 even in a case where the length L1 of the intermediate cross member 122 is shorter than the gap D1 between the rocker panels 106. In other words, the intermediate cross member 122 can be reliably bonded to the rocker panel 106 even in a case where there is a gap between the intermediate cross member 122 and the rocker panel 106.

In the present embodiment, the intermediate connecting member 134 has the first contact surface 138, and thus the intermediate connecting member 134 can be brought into surface contact with the rocker panel 106 by the first contact surface 138. Although a line or point contact structure may be adopted as a first contact portion instead of the structure of surface contact with the rocker panel 106 as described above, the contact part is wider in the present embodiment than in the line or point contact structure. Accordingly, a structure can be adopted that allows the intermediate connecting member 134 to be bonded more firmly to the rocker panel 106.

The first contact surface 138 has three surfaces (first contact upper surface 138U and two first contact inner surfaces 138N) and the first contact upper surface 138U and the first contact inner surface 138N have different normal directions. Accordingly, a higher bond strength can be obtained than in a structure in which the first contact upper surface 138U and the first contact inner surface 138N have the same normal direction.

Likewise, the intermediate connecting member 134 has the second contact surface 140, and thus the intermediate connecting member 134 can be brought into surface contact with the intermediate cross member 122 by the second contact surface 140. Although a line or point contact structure may be adopted as a second contact portion instead of the structure of surface contact with the intermediate cross member 122 as described above, the contact part is wider in the present embodiment than in the line or point contact structure. Accordingly, a structure can be adopted that allows the intermediate connecting member 134 to be bonded more firmly to the intermediate cross member 122.

The second contact surface 140 has three surfaces (second contact upper surface 140U, second contact front surface 140F, and second contact rear surface 140R) and the second contact upper surface 140U, the second contact front surface 140F, and the second contact rear surface 140R have different normal directions. Accordingly, a bonding structure firmer than a structure in which the second contact upper surface 140U, the second contact front surface 140F, and the second contact rear surface 140R have the same normal direction can be adopted.

The intermediate cross member 122 is supported by the surface portion 116 in both end portions thereof. As a result, the position of the intermediate cross member 122 in the vehicle up-down direction becomes more stable, and thus the state of bonding of the intermediate cross member 122 to the rocker panel 106 also becomes more stable. In addition, some of the load of the intermediate cross member 122 acts on the surface portion 116 and does not act on the intermediate connecting member 134, and thus the load that acts on the intermediate connecting member 134 is reduced and the state of bonding between the rocker panel 106 and the intermediate cross member 122 by the intermediate connecting member 134 becomes more stable.

In the present embodiment, the frame member 104 has the rocker panels 106, the rear cross member 108, and the front cross member 110 and is formed in a frame shape. In other words, the frame member 104 is shaped such that the gap D1 between the rocker panels 106 can be maintained constant. The intermediate cross member 122 can be more reliably bonded to the rocker panel 106 by the intermediate connecting member 134 being used in the shape allowing the gap D1 between the rocker panels 106 to be maintained constant as described above.

The rocker panel 106 has the energy absorbing member 118, and the energy is absorbed by the energy absorbing member 118 being compressed by a load acting from the vehicle width direction outside. In the present embodiment, the yield strength of compression of the intermediate connecting member 134 in the vehicle width direction is lower than the yield strength of compression of the energy absorbing member 118. As a result, the intermediate connecting member 134 does not inhibit the compression of the energy absorbing member 118. In other words, the energy can be more reliably absorbed by the energy absorbing member 118 being reliably compressed.

The intermediate cross member 122 is disposed in the battery mounting range BE of the vehicle lower portion structure 102 and does not reach the energy absorption range AE. Accordingly, the intermediate cross member 122 does not inhibit deformation of the energy absorbing member 118 attributable to an external force from the vehicle width direction outside. In other words, in the present embodiment, the intermediate cross member 122 can be more reliably bonded to the rocker panel 106 in the structure in which the intermediate cross member 122 is short to the extent that the intermediate cross member 122 does not reach the energy absorption range AE as described above.

The yield strength of compression of the intermediate connecting member 134 may be lower than the yield strength of compression of the energy absorbing member 118. For example, the yield strength of compression of the intermediate connecting member 134 may be low to the extent that the yield strength of compression of the intermediate connecting member 134 substantially has little effect on the compression of the energy absorbing member 118. Furthermore, a structure may be adopted in which the intermediate connecting member 134 also is compressed with respect to a load in the vehicle width direction and plays a part in energy absorption.

The structure in which the yield strength of compression of the intermediate connecting member 134 is low is not particularly limited. For example, the body portion 136 of the intermediate connecting member 134 may have a reduced plate thickness as a whole or a thin-walled portion and a slit may be formed in part.

In the above description, a structure has been exemplified in which the intermediate cross member 122 is short to the extent that the intermediate cross member 122 does not reach the energy absorption range AE so that deformation of the energy absorbing member 118 attributable to an external force from the vehicle width direction outside is not inhibited. However, the factor of the length L1 of the intermediate cross member 122 shorter than the gap D1 between the rocker panel inner surfaces 106N is not limited thereto.

For example, a dimensional error may occur in the length of the intermediate cross member with respect to a design-related numerical value. In the intermediate cross member 122 that is continuous in the vehicle width direction as in the present embodiment, the length of the dimensional error is longer than in a divided intermediate cross member. In a case where the length L1 of the intermediate cross member 122 is longer than the gap D1 between the rocker panels 106, the intermediate cross member 122 cannot be disposed between the rocker panel inner surfaces 106N of the rocker panels 106. Accordingly, in some cases, the design length of the intermediate cross member 122 is set short so that the length of the intermediate cross member 122 is still shorter than the gap D1 between the rocker panels 106 even in a case where the length of the intermediate cross member 122 increases due to the dimensional error. In this case, however, a relatively large gap is formed between the intermediate cross member 122 and the rocker panel 106 once the length of the intermediate cross member 122 is further reduced due to the dimensional error. In the present embodiment, the intermediate cross member 122 can be reliably bonded to the rocker panel 106, by the intermediate connecting member 134 being used, even in a structure in which a relatively large gap is formed between the intermediate cross member 122 and the rocker panel 106 due to the dimensional error in the length of the intermediate cross member 122.

What is claimed is:

1. A vehicle lower portion structure comprising:
    a pair of rocker panels, the rocker panels being separated from each other in a vehicle width direction and extending in a vehicle front-rear direction;
    an intermediate cross member disposed between the rocker panels and extending in the vehicle width direction;
    an intermediate connecting member disposed in an end portion of the intermediate cross member in the vehicle width direction and provided with a first contact portion being contact with the rocker panel and a second contact portion being contact with the intermediate cross member;
    a first bonding portion bonding the first contact portion to the rocker panel; and
    a second bonding portion bonding the second contact portion to the intermediate cross member.

2. The vehicle lower portion structure according to claim 1, further comprising:
    a front cross member connecting the rocker panels to each other and disposed on a front side of the vehicle lower portion structure; and
    a rear cross member connecting the rocker panels to each other and disposed rearward of the front cross member, wherein a frame-shaped frame member is constituted by the rocker panels, the front cross member, and the rear cross member.

3. The vehicle lower portion structure according to claim 1, wherein:
    the first contact portion is a first contact surface being surface contact with the rocker panel; and
    the second contact portion is a second contact surface being surface contact with the intermediate cross member.

4. The vehicle lower portion structure according to claim 3, wherein:
    the intermediate cross member is provided with a cross member upper surface positioned on a vehicle upper side, a cross member front surface positioned forward of the cross member upper surface, and a cross member rear surface positioned rearward of the cross member upper surface; and
    the second contact surface is provided with a second contact upper surface being contact with the cross member upper surface, a second contact front surface being contact with the cross member front surface, and a second contact rear surface being contact with the cross member rear surface.

5. The vehicle lower portion structure according to claim 4, wherein the second contact upper surface, the second contact front surface, and the second contact rear surface have normal lines in different directions.

6. The vehicle lower portion structure according to claim 3, wherein:
    the rocker panel is provided with a rocker panel upper surface positioned on a vehicle upper side of the rocker panel and a rocker panel inner surface positioned below and inward of the rocker panel upper surface in the vehicle width direction; and
    the first contact surface is provided with a first contact upper surface being contact with the rocker panel upper surface and a first contact inner surface being contact with the rocker panel inner surface.

7. The vehicle lower portion structure according to claim 6, wherein the first contact upper surface and the first contact inner surface have normal lines in different directions.

8. The vehicle lower portion structure according to claim 6, wherein:
    a normal line of the rocker panel inner surface is toward a vehicle inside in a vehicle horizontal direction; and
    a normal line of the first contact inner surface is toward a vehicle outside in the vehicle horizontal direction.

9. The vehicle lower portion structure according to claim 6, wherein the rocker panel has a surface portion disposed below and inward of the rocker panel inner surface in the vehicle width direction to support the end portion of the intermediate cross member in the vehicle width direction.

10. The vehicle lower portion structure according to claim 9, wherein:
    the rocker panel includes the surface portion, a rocker panel lower portion disposed below the surface portion, and a rocker panel upper portion disposed above the surface portion; and
    the rocker panel lower portion protrudes inward in the vehicle width direction more than the rocker panel upper portion.

11. The vehicle lower portion structure according to claim 1, further comprising an energy absorbing member disposed to overlap the intermediate connecting member in part or in whole in the vehicle width direction to absorb energy by being deformed by a load that is applied inward in the vehicle width direction,
    wherein a yield strength of compression of the intermediate connecting member is lower than a yield strength of compression of the energy absorbing member in the vehicle width direction.

12. The vehicle lower portion structure according to claim 1, wherein a length of the intermediate cross member in the vehicle width direction is shorter than a gap between inner surfaces of the rocker panels.

13. The vehicle lower portion structure according to claim 1, wherein the intermediate cross member is disposed with a gap formed between the end portion of the intermediate cross member in the vehicle width direction and the rocker panel.

14. The vehicle lower portion structure according to claim 1, wherein the first bonding portion is at least one male screw and the second bonding portion is at least one male screw.

\* \* \* \* \*